United States Patent
Rega et al.

(10) Patent No.: US 8,781,436 B2
(45) Date of Patent: Jul. 15, 2014

(54) METHOD AND SYSTEM FOR ENABLING A USER TO CONFIGURE CUSTOM VOICE ALARMS/EVENTS FOR MOBILE COMMUNICATION DEVICES

(75) Inventors: Meri-Frances Rega, Cary, NC (US); Gregory A. Dunko, Cary, NC (US)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/206,069

(22) Filed: Aug. 9, 2011

(65) Prior Publication Data

US 2013/0040611 A1    Feb. 14, 2013

(51) Int. Cl.
*H04M 11/04* (2006.01)
*H04L 29/08* (2006.01)
*H04M 1/725* (2006.01)

(52) U.S. Cl.
CPC ............... *H04L 67/34* (2013.01); *H04L 67/04* (2013.01); *H04M 1/72566* (2013.01)
USPC ..................................... 455/404.1

(58) Field of Classification Search
CPC ...... H04L 67/04; H04L 67/34; H04L 1/72566
USPC ............ 455/412.1–412.2, 414.1, 414.4, 415, 455/418–420, 550.1, 567; 379/373.01, 379/373.04, 76, 167.08
See application file for complete search history.

(56) References Cited

U.S. PATENT DOCUMENTS

| 2007/0168064 A1* | 7/2007 | Galvin et al. ................... 700/94 |
| 2008/0064372 A1* | 3/2008 | Ryu et al. ................... 455/412.2 |
| 2010/0161683 A1* | 6/2010 | Leeds et al. ................... 707/803 |
| 2010/0197284 A1* | 8/2010 | Small et al. ............... 455/414.1 |

* cited by examiner

*Primary Examiner* — Babar Sarwar
(74) *Attorney, Agent, or Firm* — McClure, Qualey & Rodack, LLP

(57) ABSTRACT

In one embodiment, a method comprising receiving at a mobile device plural user inputs entered at a user interface of the mobile device, the inputs comprising a text message or a recorded voice message of a user that indicates a manner of generating a custom voice alarm; sending a request to a server device based on the user inputs, the request configured to cause the server device to convert the request into the custom voice alarm; receiving the custom voice alarm at the mobile device; and triggering activation of the custom voice alarm at the mobile device based on user selection of a triggering event.

21 Claims, 13 Drawing Sheets

METHOD AND SYSTEM FOR ENABLING A USER TO CONFIGURE CUSTOM VOICE ALARMS/EVENTS FOR MOBILE COMMUNICATION DEVICES

TECHNICAL FIELD

The present disclosure generally relates to alarm functionality in mobile devices.

BACKGROUND

Over the years, portable handheld devices, such as mobile devices (e.g., smartphones) have become prevalent. Most mobile devices come equipped with a built-in clock or clock application and an alarm setting function. Typically, these alarms are "pre-canned" beeps or tones, and occasionally, a ringtone may be selected for such alerts.

SUMMARY

In one embodiment, an electronic device, comprising: a user interface; a memory comprising alarm logic; and a processor configured to execute the alarm logic to: receive input entered by a user at the user interface, the input corresponding to user configuration of a custom voice alarm; send a request to a server device based on the input; receive the custom voice alarm from the server device, the custom voice alarm based on the request; and trigger activation of the custom voice alarm based on a triggering event.

In another embodiment, receiving at a mobile device plural user inputs entered at a user interface of the mobile device, the inputs comprising a text message or a recorded voice message of a user that indicates a manner of generating a custom voice alarm; sending a request to a server device based on the user inputs, the request configured to cause the server device to convert the request into the custom voice alarm; receiving the custom voice alarm at the mobile device; and triggering activation of the custom voice alarm at the mobile device based on user selection of a triggering event.

In another embodiment, a server device, comprising: a memory comprising alarm generation logic; and a processor configured to execute the alarm generation logic to: receive a request from a mobile device, the request comprising a text message or a recorded voice message of a user that indicates a manner of creating a custom voice alarm; and generate the custom voice alarm based on the request, the custom voice alarm comprising a verbalized message corresponding to the text message, the voice message accompanied with one or a combination of music or video, or a modified version of the voice message with or without one or a combination of music or video.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
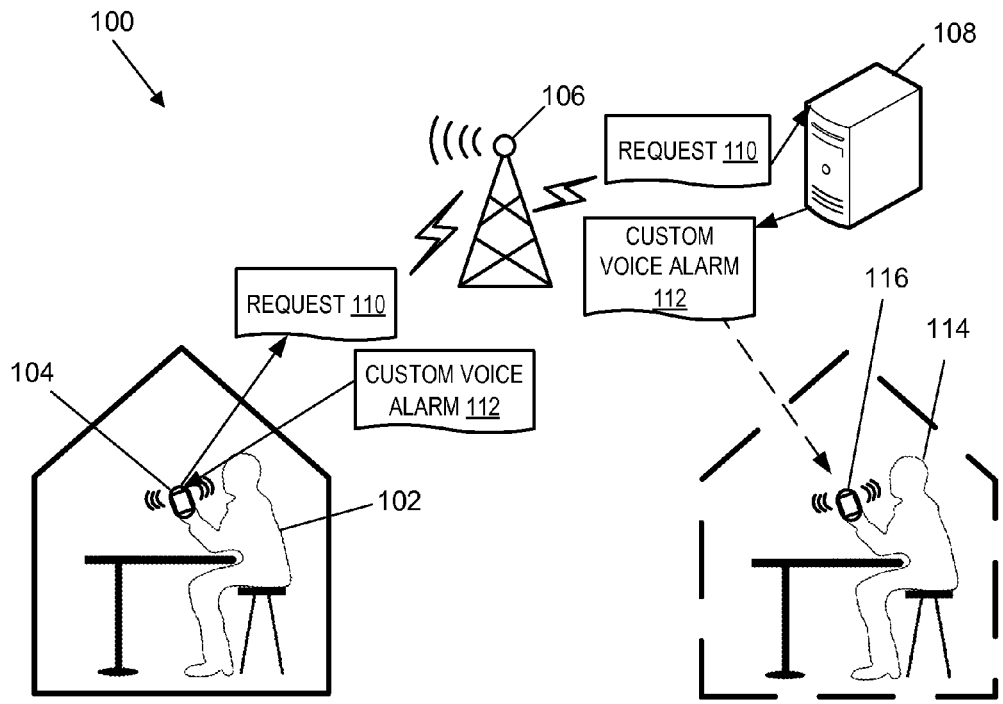
FIGS. 1A and 1B are schematic diagrams that depict an example application for an embodiment of a custom voice alarm system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As set forth above, many mobile devices (e.g., wireless devices) provide the function of alarm settings. For instance, users may set the alarm at a desired time and even set the ringtone type (e.g., ringtones may be uploaded by a user) to the mobile device. Certain embodiments of a custom voice alarm system are disclosed that enables a user to input text messages (or in some embodiments, a voice recording) at a user interface of the mobile device and optionally select an images/video/audio file that he or she prefers to be played-back as a multimedia, custom voice alarm. The inputted information is configured into a request that is sent to a server device. The server device generates a custom voice alarm based on the information in the request, and delivers the custom voice alarm to the user's mobile device to be played back upon a triggering alarm event (e.g., wake-up time, reminder time, etc.). For instance, a mobile device may comprise a built-in clock and functionality to determine an alarm time. In addition, the mobile device may be configured to "play" an alarm message (e.g., MP3 file, WAV file, MPEG file, etc.) when an alarm expiration is triggered.

In one embodiment, when a user wishes to set his or her alarm, he may create a request comprising a text message with the desired alarm message (e.g., what he or she wants the alarm message to convey to the recipient of the alarm) to be presented when triggered. For instance, the user may enter the phrase, "wake up sleepyhead," which is the phrase the user desires to hear as his or her alarm message. Optionally, the user may indicate a desired accent or dialect (accent and dialect used interchangeably herein), such as a British accent, New Jersey accent, or other region. In lieu of, or in addition to, the accent option, the user may indicate a desired effect (e.g., helium voice, Darth Vader voice, etc.) for the playback of the message when the alarm is triggered.

The request (which in this example may be a data stream comprising the text message and indications of the accent and/or effects option and optionally the content destination address) are sent to a server device, where the request is processed. The server device then generates a custom voice alarm based on the request, and delivers the custom voice alarm to the mobile device of the user (or in some embodiments, the mobile device of another user), where the custom voice alarm is stored.

The user may subsequently set his or her alarm, selecting the custom voice alarm option among other options. Once the alarm is triggered, the mobile device plays back a custom voice alarm message (e.g., "wake up sleepy head") as modified by the accents, effects, and/or file attachments. These and other embodiments are described below.

Reference is made to FIG. 1A, which depicts an example application for an embodiment of a custom voice alarm system. It should be appreciated that this example is merely illustrative, and that other applications are contemplated to be within the scope of the disclosure. A wireless communication system 100 is depicted, in which a user 102 possesses a mobile device 104 (e.g., smartphone) and communicates via a cell tower 106 with a server device 108. It should be appreciated that the cell tower 106 may be part of, or used in cooperation with, another network that enables SMS (short message service), MMS (multimedia messaging service), or IP-based communications with the server device 108 or other devices. In this example, the user 102 enters input at a user interface of the mobile phone 104 in the form of a text message and an indication of an accent and/or effect in which an audible version of the text message is to be played back as a custom voice alarm.

In other words, the mobile phone 104 sends a request 110 to the server device 108. The request 110 embodies a data stream (e.g., formatted as SMS, IP-based, etc.) comprising the inputted text message (or in some embodiments, voice recording, as explained below) that conveys a phrase the user 102 wishes to be audibly presented later upon the triggering of an alarm function on the mobile device 104. In this example, the phrase texted by the user 102 is "Luke wake up and may the force be with you." The request 110 may further include an indication of an accent and/or effects in which the phrase is to be audibly presented, though in some embodiments, a default voice may be generated by the server device 108 when no accent and/or effect is indicated in the request. In this example, assume the user 102 has indicated via input that the phrase is to be audibly presented using the voice effect of a Star War's movie character, such as Obi-Wan Kenobi's voice.

The server device 108 receives the request 110 and processes the same to generate a custom voice alarm 112. In other words, the server device 108 converts the text message into an audible version of the text message. For instance, the server device 108 may be configured to access a library of stored effects, and convert the text message, "Luke wake up and may the force be with you" into an audio file formatted according to the indicated effect (e.g., in Obi-Wan Kenobi's voice). The server device 108 then delivers the custom voice alarm 112 to the mobile device 104 of the intended (e.g., as addressed in, or in association with, the request 110) recipient user 102. In one embodiment, the intended recipient may be the user 102 that created the request 110. In some embodiments, the intended recipient may be another user 114 (in addition to, or in lieu of, the user 102), and in particular, the custom voice alarm 112 may be delivered to the other user's mobile device 116. The custom voice alarm 112 is stored in the mobile device 104 (and/or mobile device 116) upon receipt.

Figure 1B:
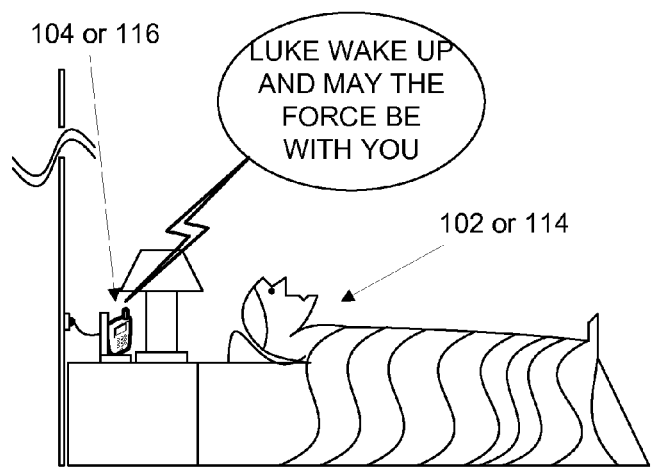

Referring to FIG. 1B, assume the user 102 (or 114) has selected a custom voice alarm option, as well as a date and time (e.g., triggering event) that the alarm is to be triggered. Responsive to the triggering event (e.g., time elapse), the mobile device 104 (and/or 116 where applicable) activates the custom voice alarm, and the audio (e.g., voice) file is played back to the user 102 (and/or 114) resulting in the phrase, "Luke wake up and may the force be with you" being audibly presented in Obi-Wan Kenobi's voice. In other words, instead of the presentation of a ringtone, or chime, or buzzer in response to the user's set wake-up time, a custom voice alarm is presented.

Figure 2:
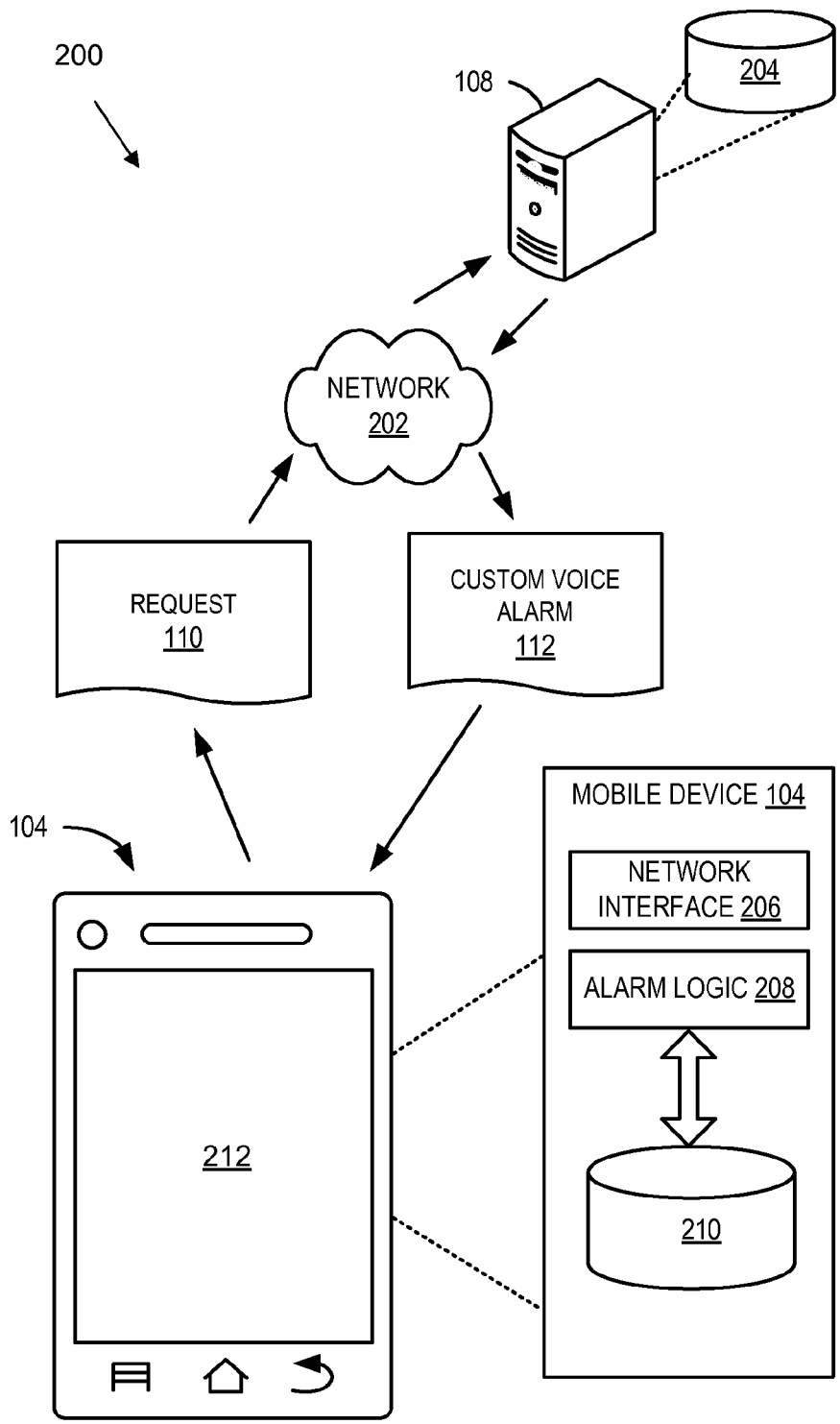
FIG. 2 is a block diagram that depicts an embodiment of a custom voice alarm system.

Having described one example application of an embodiment of a custom voice alarm system, attention is directed to FIG. 2, which illustrates one embodiment of a custom voice alarm system 200. In one embodiment, the custom voice alarm system 200 comprises the mobile device 104 and the server device 108. In some embodiments, a custom voice alarm system may embody a subset of these components (e.g., the mobile device 104 or logic therein) or in some embodiments, additional components (e.g., additional mobile devices, server devices, etc.). In the embodiment depicted in FIG. 2, the mobile device 104 communicates (based on user input) one or more requests 110 to the server device 108 over one or more networks 202. A request 110 may include a text message, and optionally an indication of effects intended to be applied to a voice-version of the text message and/or an indication of an accent to be applied to a voice-version of the text message. Note that such accents and/or effects may be applied to a voice recording communicated by the mobile device as part of the request 110, or in some embodiments, as applied to a remotely-stored default voice file (e.g., stored in the server device 108).

In some embodiments, attachments may also be added as part of the request 110. For instance, the attachment may be an audio file corresponding to music or a song that the user desires to be played along with the audible version of the text message (e.g., the custom voice alarm). In some embodiments, the attachment may be a video or image file to be played back in association with the playback of the audible version of the text message. In some embodiments, the text message alone may be sent by the mobile device 104, and the absence of any indications (e.g., of accents or effects) may be construed by the server device 108 to use a stored default voice to convey the text message of the request 110 as the custom voice alarm. In some embodiments, the request 110 includes a recipient destination of the custom voice alarm. In some embodiments, the recipient destination is associated with, but not integrated in, the request 110. The request 110 may be sent to the server device 108 as an SMS type message, or in some embodiments, as an IP-based communication.

The network 202 comprises a cellular network, a wide area network, local area network, hybrid network (e.g., wired and wireless), or a combination of two or more of these types of networks.

The server device 108 comprises a storage unit 204 that contains a library of files (e.g., audio, video, etc.) associated with effects and/or accents that are indexed by the indications in the requests 110. For instance, in one embodiment, selection at the mobile device 104 of a given effect and/or accent may correspond (e.g., at a lower data layer) to settings of a bitmap (e.g., an example of an indication) that is communicated by the mobile device 104 to the server device 108. In other words, the mobile device 104 may create a bit-string for the text and different options (e.g., accents and/or effects), and send the bit string with the text message over a given channel as an IP packet(s) or SMS/MMS text message. Client-server logic at respective devices (e.g., at the mobile device 104 and server device 108) enable parsing of the IP packets and execution of the custom alarm functionality according to known IP based packet processing. In the SMS approach, a custom protocol might be defined whereby standard fields are re-defined for text message content and custom voice alarm parameters. Alternatively, in the SMS approach, the server device 108 may comprise logic (custom voice alarm generation logic) that recognizes fields that are outside of an established text message protocol field and parse those data bits and equate each bit setting to a given accent and/or effect. In an MMS approach, fields for multimedia attachments may be used to carry indications of accents and/or effects that are selected at the mobile device 104. In some embodiments, the indication may be a described effect and/or accent in the text message itself (e.g., as delineated by a tag, created by the alarm logic 208, in the text message, such as a symbol ("( )") or "<>") that is parsed by the server device 108 and used to perform a search of a database for an associated file. In one embodiment, the determination of whether the tag is associated with an effect or accent may be based on the type of tag (e.g., parenthesis, bracket, etc.) used in the text message.

Other known mechanisms of providing an indication of the accents and/or effects may be used. For instance, in some embodiments, a given combination of text with the options accents, effects, and/or multimedia file attachments may be equated by the mobile device 104 to an address or number at the server device 108, somewhat similar to texting a user's choice for a given American Idol or Dancing with the Stars performer. In other words, the mobile device 104 may comprise a library of a number of different combinations that are equated (e.g., in a look up table or corresponding to a bitmap) to the destination number or address at the server device 108.

The server device 108 comprises custom voice alarm generation logic (also referred to herein as alarm generation logic for brevity) that parses the request 110 and accesses a requested effects file and/or accent file from the storage unit 204 at an address corresponding to the bitmap code (or other indication, as explained above). The alarm generation logic converts the text to an audio (e.g., voice) file and further modifies the voice of the synthesized audio file (or in some embodiments, modifies a received voice recording file that is sent by the mobile device 104) based on the requested effects and/or accent. One having ordinary skill in the art, in the context of the present disclosure, should understand that other mechanisms may be used to access the various files of the storage unit 204, such as through the communication by the mobile device 104 of a uniform resource locator (URL), among other known mechanisms.

The alarm generation logic generates the custom voice alarm 112, including incorporation of any attachments (e.g., video, image, and/or audio (e.g., music)), and delivers the custom voice alarm 112 to the mobile device 104. The custom voice alarm 112 may be sent to the mobile device 104 as a multimedia text message (MMS) or as an IP-based communication.

The mobile device 104 comprises a network interface unit 206 to enable communications over the network 202. The mobile device 104 also includes alarm logic 208 that enables the configuration of alarm functionality (e.g., setting the date, time, and manner of presentation of the alarm), and in particular, the construction of a request 110 and playback of the custom voice alarm 112 resulting from the request. The alarm logic 208 may operate in cooperation with a storage unit 210 (e.g., memory, or in general, a computer readable medium), which stores a plurality of displayable (and selectable) effect and/or accent options (and underlying indicators or indexes for those options), as well as storage of standard alarms and custom voice alarms previously configured by the user.

The selection of options and/or alarm types is enabled through a touch-type display screen 212, though in some embodiments, user entry may be accomplished through keypad entry (e.g., non-displayed, electro-mechanical button entry, such as a function button) or a combination of touch-screen and keypad entry.

Figure 3:
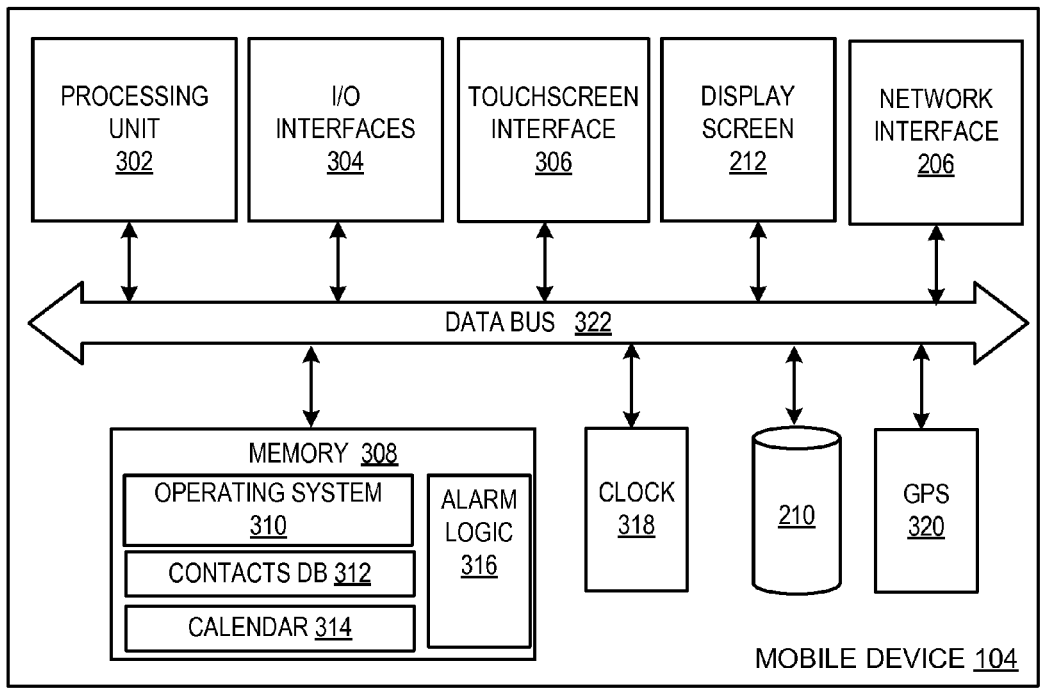
FIG. 3 is a block diagram that depicts an example embodiment of a custom voice alarm system residing within, or embodied as, a mobile device.

FIG. 3 depicts an example embodiment of a mobile device 104. It should be appreciated that the mobile device 104 depicted in FIG. 3 is merely illustrative, and that other variations or devices are contemplated to be within the scope of the disclosure, including mobile devices with alpha-numeric keypad buttons (non-screen display buttons) or clock accessories to the mobile device 104. Further, it should be appreciated that, though the mobile device 104 is illustrated as a smartphone, other devices with alarm functionality are contemplated, including a wireless (or wired) clock accessory that is communicatively coupled to the mobile device, watch phone, tablet as well as any one of a wide variety of wired and/or wireless computing devices. As shown in FIG. 3, the mobile device 104 comprises a processing unit 302, one or more I/O interface units (I/O interface) 304 (e.g., USB connection via a USB, micro-USB, or mini-USB connector, a Bluetooth connection, etc.), a touchscreen interface 306, a display screen 212, a network interface unit (network interface) 206, memory 308, a clock 318 (e.g., hardware, software, or a combination of both), a local storage unit 210, and optionally a GPS unit (GPS) 320 (or in some embodiments, other types of locator components or units, such as those based on triangulation, among others), each coupled to one another over one or more busses, such as data bus 322. The memory 308 further comprises a native operating system 310, a contacts database 312, a calendar application 314, and alarm logic 316. Those skilled in the art should appreciate that the mobile device 104 includes other components or units, known in the art, not shown for purposes of brevity. For instance, the mobile device 104 may further include built-in camera logic for capturing images or video, or browser logic for accessing the Internet, among other functionality. Further, functionality of one or more components depicted in FIG. 3 may be combined in a single module, or further distributed among additional modules.

The processing unit 302 may include any custom made or commercially available processor, a central processing unit (CPU) or an auxiliary processor among several processors associated with the mobile device 104, a semiconductor based microprocessor (in the form of a microchip), a macroprocessor, one or more application specific integrated circuits (ASICs), a plurality of suitably configured digital logic gates, and other well-known electrical configurations comprising discrete elements both individually and in various combinations to coordinate the overall operation of the computing system.

The memory 308 may include any one of a combination of volatile memory elements (e.g., random-access memory (RAM, such as DRAM, and SRAM, etc.)) and nonvolatile memory elements. As indicated above, the memory 308 typically comprises the operating system 310, one or more native applications, emulation systems, or emulated applications for any of a variety of operating systems and/or emulated hardware platforms, emulated operating systems, etc. For example, the applications may include application specific software, such as the alarm logic 316 (explained further below), the contacts database 312, and the calendar 314, among others components.

The contacts database 312 may comprise a data structure (e.g., database, though not limited to a database format) with plural fields that help identify a contact that may later serve as a recipient of the custom voice alarm or other communications from the user of the mobile device 104. Such fields may include recipient information such as name, address, phone number, classification of the recipient or association with the user (e.g., work or business, family, friend, fellow church member, supervisor, fellow employee, partner, officer, etc.), among other information that helps to identify or characterize the recipient.

The calendar 314 may comprise information fields pertaining to the dates and days for a given interval of time (e.g., one or more years), with fields associated with scheduled events or activities for the user corresponding to one or more of the dates.

The alarm logic 316 comprises graphical user interface (GUI) functionality (and underlying logic) that enables a user to set an alarm trigger date and time, and in cooperation with the clock 318, activate the alarm accordingly. The alarm logic 316 further comprises GUI generation functionality and underlying logic that enable the selection of various alarm options, including the customization of alarms and the selection of alarm types. In some embodiments, the GUI generation functionality is implemented in cooperation with the touchscreen interface 306. The alarm logic 316 further comprises functionality, in cooperation with the network interface unit 206, to prepare and format requests 110 to be sent to the server device 108 for customization of alarms.

In accordance with such embodiments, the software or data structure components are stored in memory 308 and executed by the processing unit 302. Note that in the context of this disclosure, in general, a non-transitory computer-readable medium stores programs for use by or in connection with an execution system, apparatus, or device.

The touchscreen interface 306 is configured to receive input from a user, such as via the display screen 212, and provides such functionality as on-screen buttons, menus, keyboards, etc. that allows users to navigate user interfaces by touch. One of ordinary skill in the art should appreciate that the memory 308 can, and typically will, comprise other components which have been omitted for purposes of brevity.

The network interface unit 206 comprises various components (e.g., transceiver logic) used to transmit and/or receive data over a networked environment. The I/O interface units 304 are configured to enable communication with local devices.

The GPS unit 320 comprises known GPS functionality to enable the mobile device 104 to communicate its position (e.g., geographical region). In one embodiment, the alarm logic 316 may incorporate in, or in association with, the request 110 the geographic region determined by the GPS unit 320 to enable the server device 108 to determine an appropriate accent to apply to the voice of the custom voice alarm.

Figure 4:
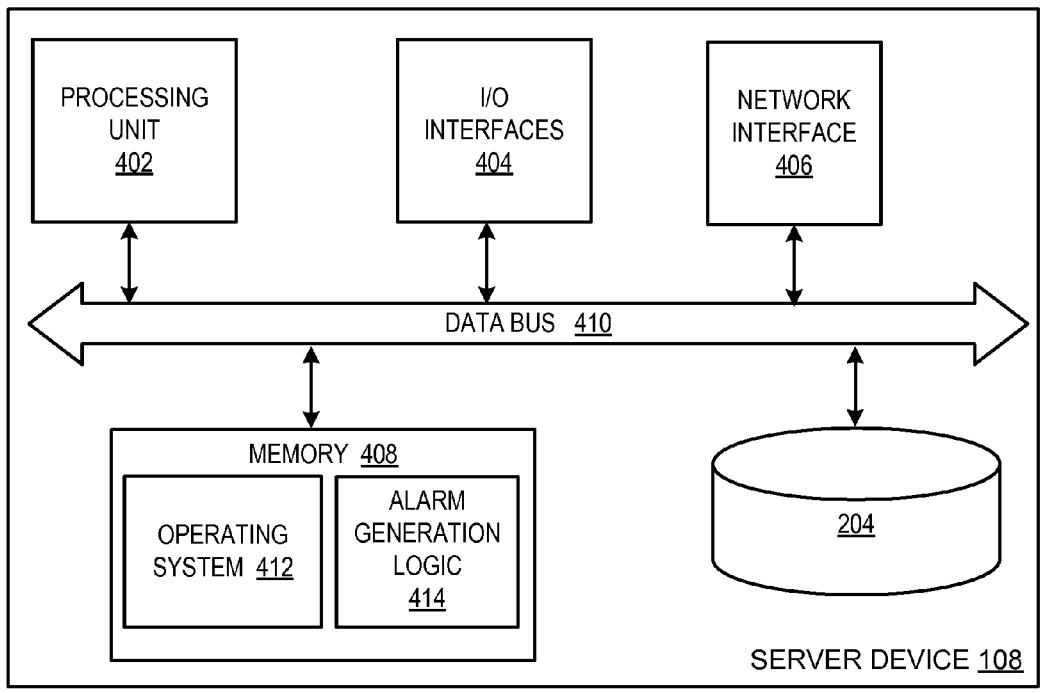
FIG. 4 is a block diagram that depicts an example embodiment of a custom voice alarm system residing within, or embodied as, a server device.

FIG. 4 depicts an example embodiment of a server device 108. It should be appreciated that the server device 108 depicted in FIG. 4 is merely illustrative, and that other variations or devices with fewer or additional components are contemplated to be within the scope of the disclosure. As shown in FIG. 4, the server device 108 comprises a processing unit 402, one or more I/O interface units (I/O interfaces) 404 (e.g., to couple to a display, such as an administrator workstation, or other local devices), a network interface unit (network interface) 406, memory 408, and a storage unit 204 (e.g., persistent storage, such as semiconductor, magnetic, or optical disc-based, DRAM, FLASH memory, ROM, etc.), all coupled to one or more data busses, such as data bus 410. Components of like name found in the mobile device 104 may be similarly configured in the server device 108, and hence discussion of the same is omitted here for brevity.

Memory 408 further comprises an operating system 412 and alarm generation logic 414. The alarm generation logic 414 comprises functionality to parse requests received by the mobile device 104, convert text messages to audio files (e.g., converting text to MP3, WAV files, etc.), modify voice recordings sent by the mobile device 104, and generally coordinate playback of the voice message with an audio file (e.g., music) and/or video (or images) files that are included with the request 110 (or in some embodiments, pointed to by the request (e.g., using an URL) for access by the server device 108). The alarm generation logic 414 further comprises functionality to package the custom voice alarm and send (e.g., as an MMS or as an IP-based communication) the custom voice alarm to the mobile device 104. In some embodiments, the server device 108 may store preconfigured user voice files in the storage unit 204, or store various effects and/or accent samples (e.g., files) that are selected and retrieved based on the requests 110 received from the mobile device 104.

Figure 5A:
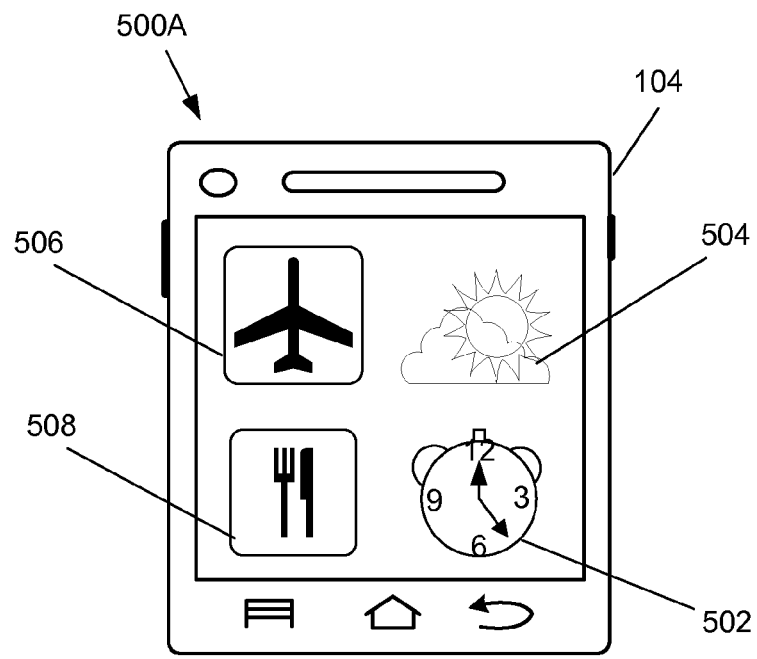
FIG. 5A is a block diagram that illustrates an example embodiment of a graphical user interface (GUI) for a mobile device of a custom voice alarm system that enables a user to select an alarm function.
Figure 5B:
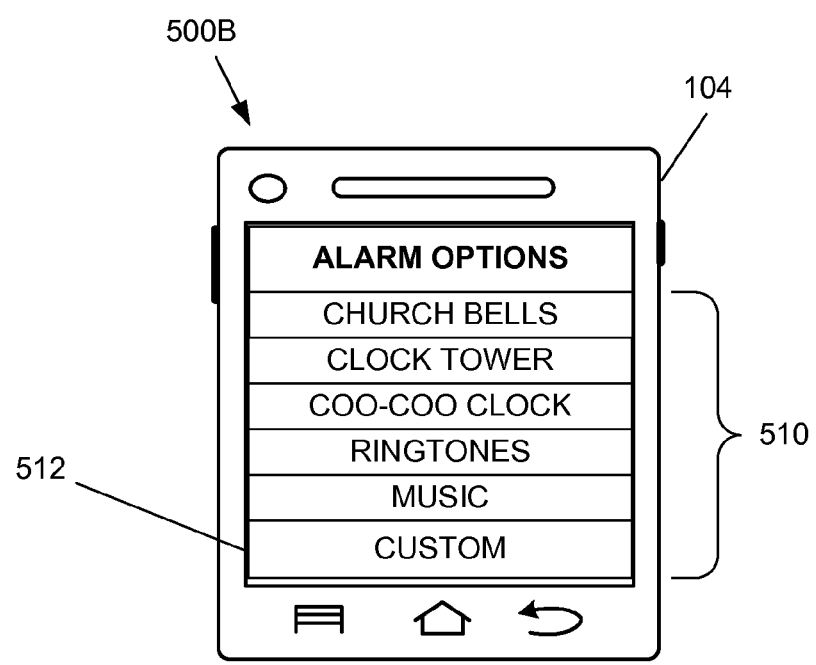
FIG. 5B is a block diagram that illustrates an example embodiment of a GUI for a mobile device of a custom voice alarm system that enables a user to select one or more options for the alarm functionality.
Figure 5C:
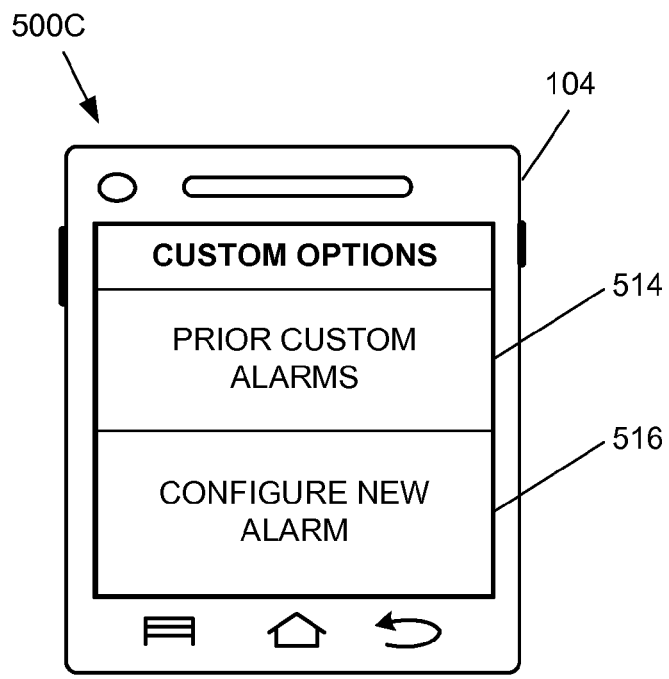
FIG. 5C is a block diagram that illustrates an example embodiment of a GUI for a mobile device of a custom voice alarm system that enables a user to select prior custom voice alarms and create requests for new custom voice alarms.
Figure 5D:
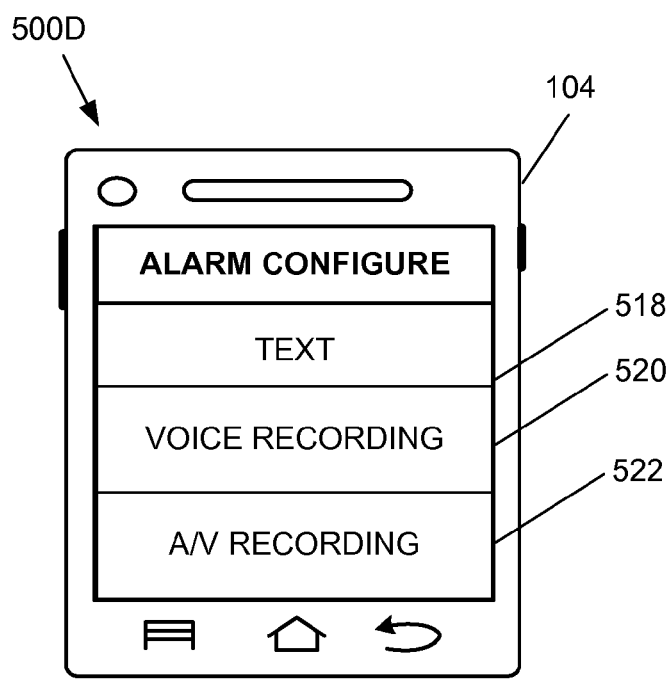
FIG. 5D is a block diagram that illustrates an example embodiment of a GUI for a mobile device of a custom voice alarm system that enables a user to select a format of the custom voice alarm requests to send to a server device.
Figure 5E:
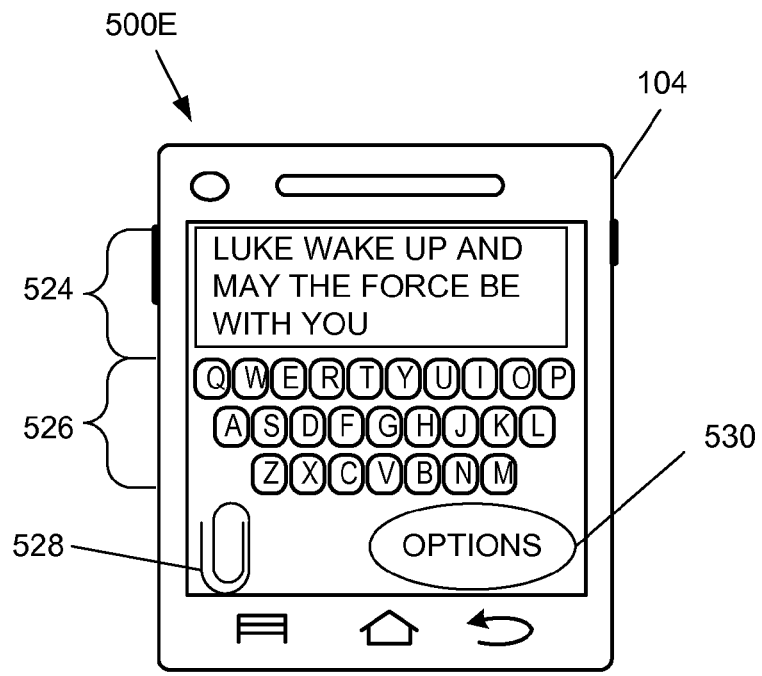
FIG. 5E is a block diagram that illustrates an example embodiment of a GUI for a mobile device of a custom voice alarm system that enables a user to format custom voice alarm requests to a server device as a text message.
Figure 5F:
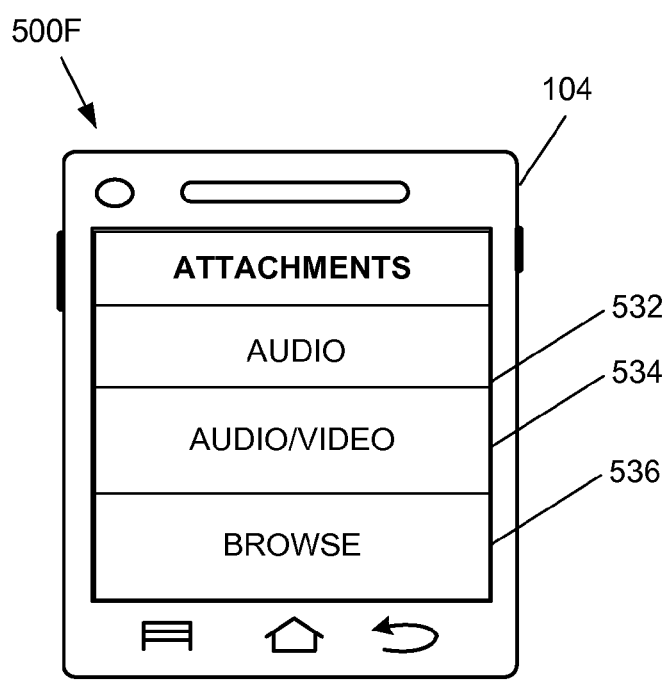
FIG. 5F is a block diagram that illustrates an example embodiment of a GUI for a mobile device of a custom voice alarm system that enables a user to include attachments as part of custom voice alarm requests to be sent to a server device.
Figure 5G:
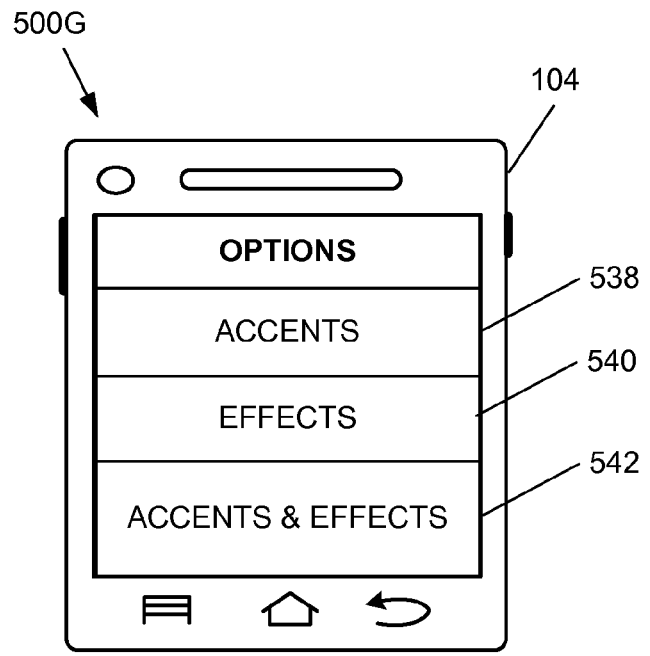
FIG. 5G is a block diagram that illustrates an example embodiment of a GUI for a mobile device of a custom voice alarm system that enables a user to select options for accents and/or effects to accompany any voice or text messages as part of custom voice alarm requests to be sent to a server device.
Figure 5H:
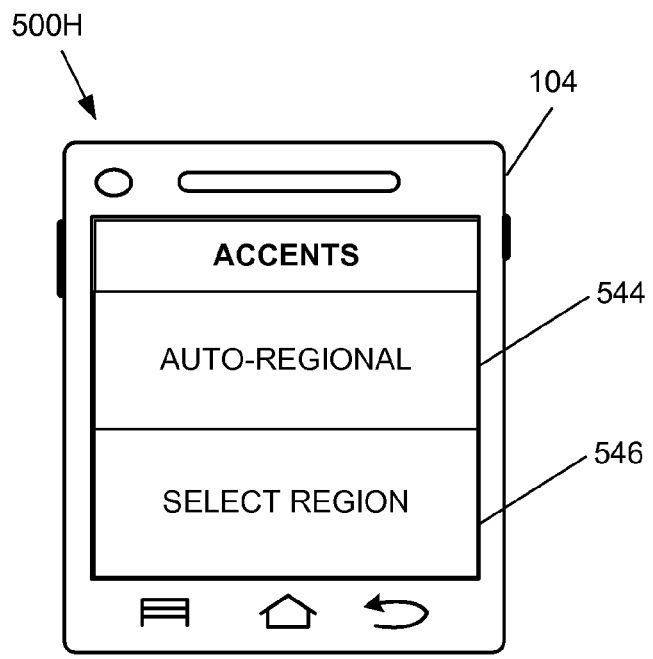
FIG. 5H is a block diagram that illustrates an example embodiment of a GUI for a mobile device of a custom voice alarm system that enables a user to select a geographic region that represents the accent to apply to any voice of a custom voice alarm.
Figure 5I:
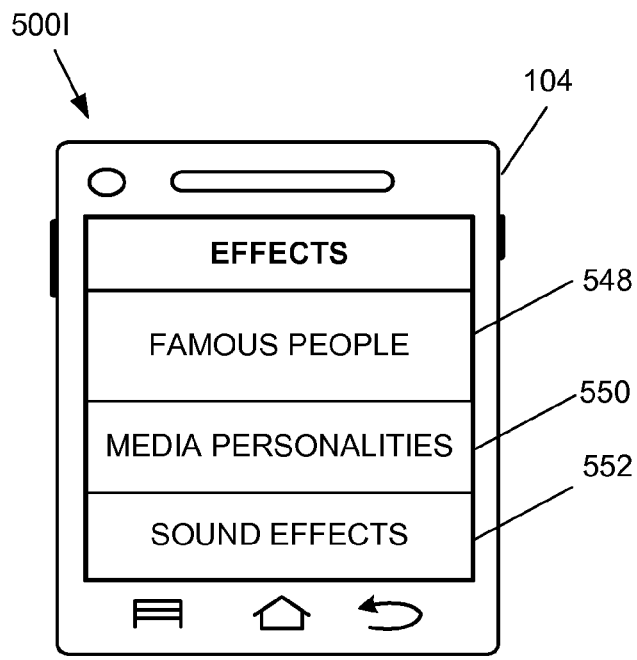
FIG. 5I is a block diagram that illustrates an example embodiment of a GUI for a mobile device of a custom voice alarm system that enables a user to select the source of effects to accompany any voice alarm.
Figure 5J:
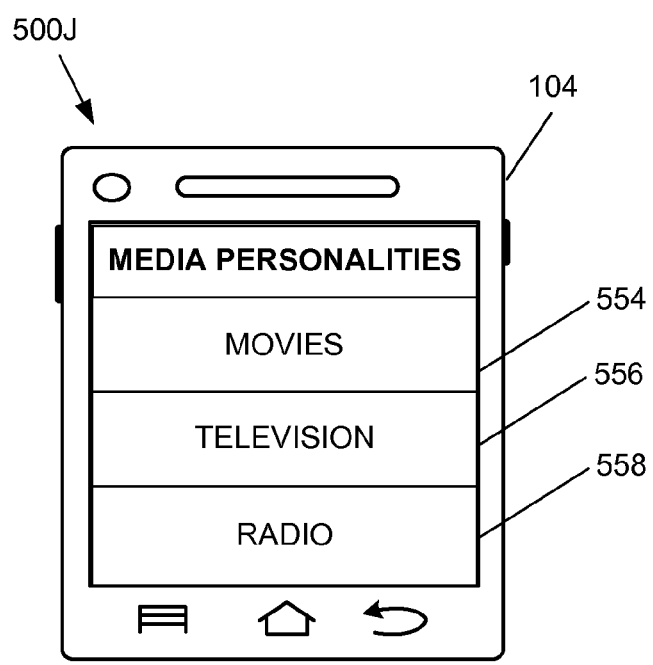
FIGS. 5J-5L are block diagrams that illustrate an example embodiment of a GUI for a mobile device of a custom voice alarm system that enables a user to further refine the source of effect options for a custom voice alarm.
Figure 5K:
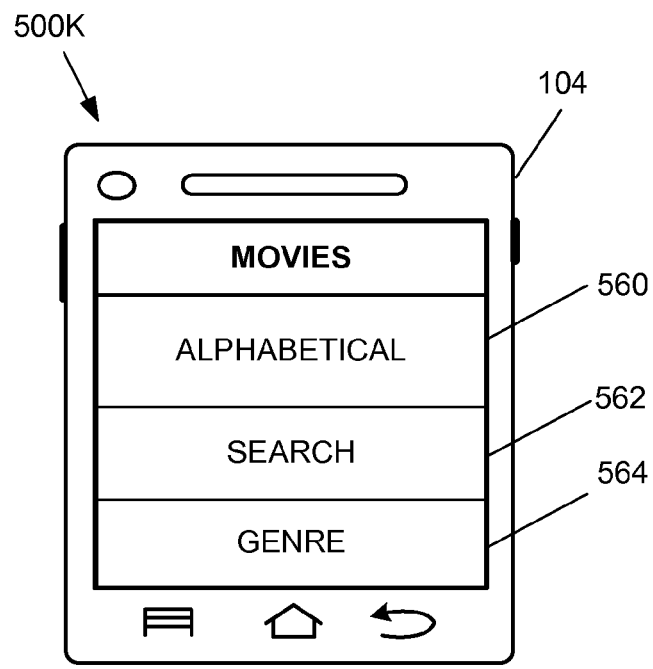
Figure 5L:
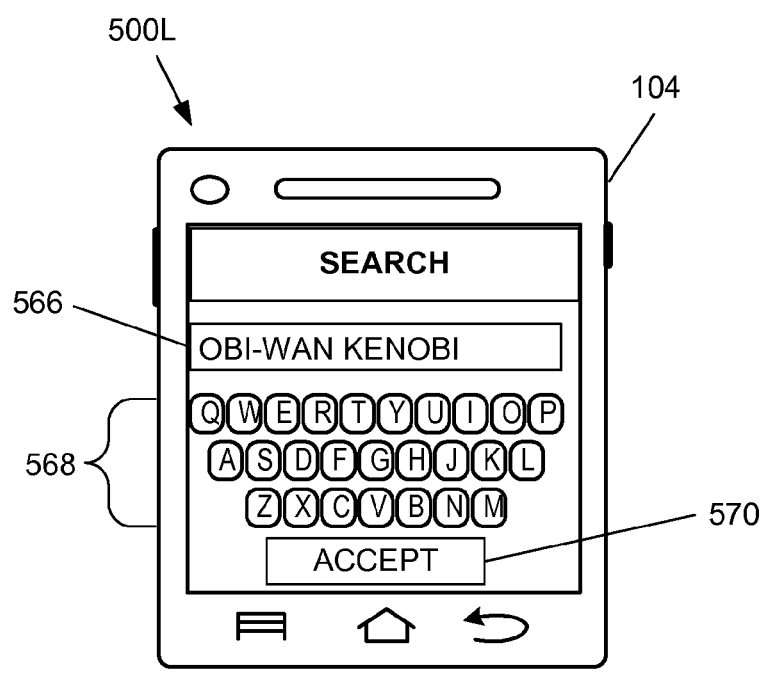
Figure 5M:
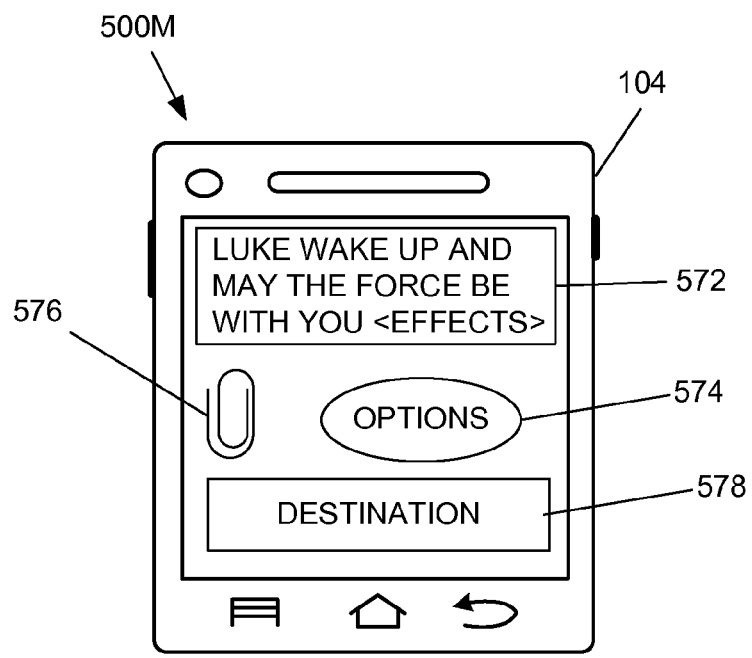
FIGS. 5M-5N are block diagrams that illustrate an example embodiment of a GUI for a mobile device of a custom voice alarm system that enables a user to select a destination of a custom voice alarm to be sent from a server device.
Figure 5N:
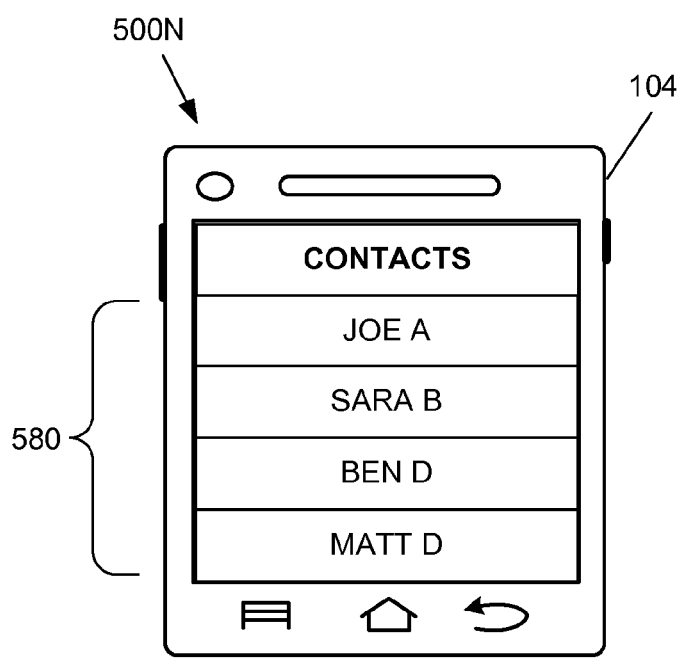
Figure 5O:
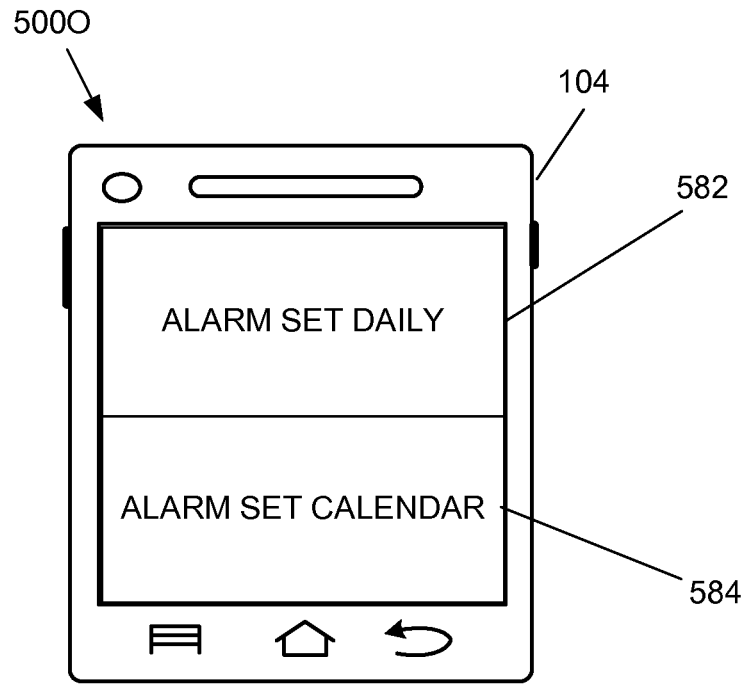
FIGS. 5O-5P are a block diagrams that illustrate example embodiments of a GUI for a mobile device of a custom voice alarm system that enables a user to select when to trigger an alarm.
Figure 5P:
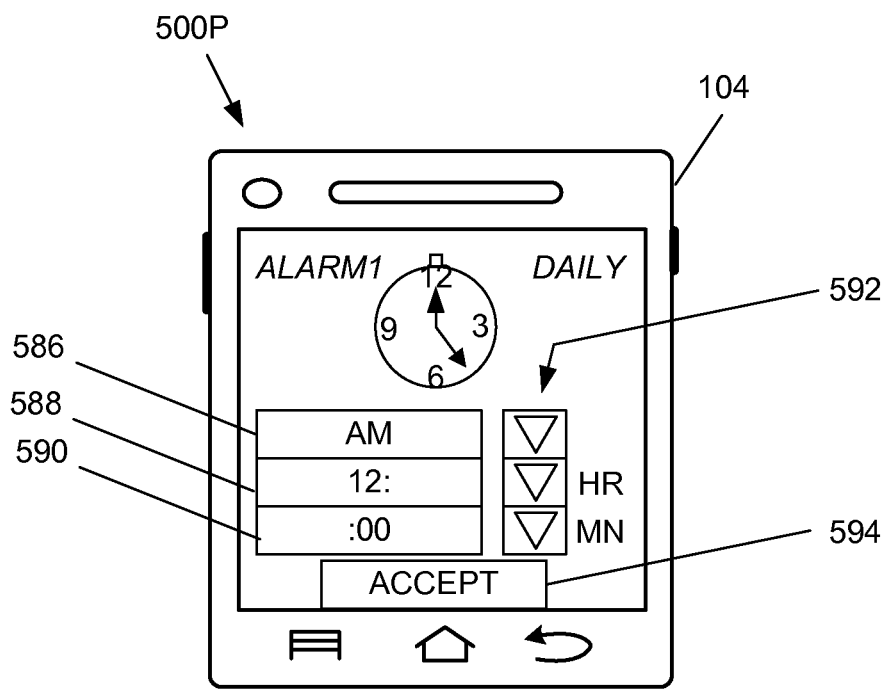

Having described certain embodiments of custom voice alarm systems, attention is directed to the example GUIs shown in FIGS. 5A-5P. Though shown as graphical user interfaces as provided by the mobile device 104, such GUIs are for illustrative purposes, and it should be appreciated that other variations of these GUIs are contemplated, including GUIs where the functionality of a plurality of the illustrated GUIs are combined into fewer GUIs, or further distributed among additional GUIs. It should be appreciated by one having ordinary skill in the art, in the context of the present disclosure that, though a particular process order may be perceived to follow from the GUIs presented in FIGS. 5A-5P, some embodiments may modify the order of processing (and hence the order in which certain GUIs appear relative to one another). Also, some GUIs may be omitted in some embodiments. Also, though shown in the context of touch-screen type displays, some embodiments may use other mechanisms, such as keypad entry, function buttons, scroll bars, voice activation, etc.

Referring to FIG. 5A, shown is a mobile device 104 with an example embodiment of a GUI 500A that is presented to a user of the mobile device 104. The GUI 500A comprises plural icons, including in this example, an alarm icon 502, a weather icon 504 for accessing weather information, a travel icon for planning a trip 506, and a restaurant icon 508 for searching for information about restaurants. Additional icons, or fewer, may be presented in some embodiments. A user may access additional icons by swiping the surface of the display with his or her hand or other object (e.g., pen, stylus, etc.) in a given direction.

Responsive to selecting (e.g., double or single tapping) the alarm icon 502, a plurality of alarm options 510 are presented, such as shown in the example GUI 500B of FIG. 5B. The user may scroll through these options (as is true with other GUI options presented subsequently in this disclosure) by swiping his or her hand (or object) across the screen, among other mechanisms for advancing choices within view of the user. As noted, the GUI 500B comprises a plurality of alarm options 510, including options corresponding to the sound or manner of presentation of the alarm, such as, without limitation, church bell sound, clock tower sound, coo-coo clock sound, ringtone sound, and music sounds. Each of these options may be selected to activate the alarm feature, or in some embodiments, invoke additional GUIs for further refinement of the selection. The alarm options 510 include a custom voice alarm option 512.

FIG. 5C shows an example GUI 500C responsive to selection by a user of the custom voice alarm option 512. As with all other GUIs, in one embodiment, additional options for a particular screen GUI may be accessed by swiping a finger (or other implement) across the screen in a given direction. In this example GUI 500C, the user is presented with custom options that include prior custom voice alarms 514 and configure new alarm 516. The prior custom voice alarm option 514, upon selection, enables a user to access prior custom voice alarms (e.g., as configured by the user in a previous session). The configure new alarm option 516, upon user selection, enables a user to embark on a custom voice alarm configuration session with the mobile device 104 and the server device 108.

Responsive to selection of the configure new alarm option 516, the user is presented (on the mobile device 104) with the example GUI 500D shown in FIG. 5D. In this GUI 500D, plural alarm configuration options are illustrated, including configuring the alarm using a text message 518, voice recording file 520, and an audio/video file 522 (e.g., via a video recording with audio, such as via a camcorder or utilizing built-in camera functionality in the mobile device 104). In other words, the manner of the conveying the message in the request 110 is selected through this GUI 500D. If the user wishes to convey the message (e.g., the phrase to be verbalized in the custom voice alarm) of the request 110 via a text message, the user selects the text message option 518. If the user wishes to convey the message (e.g., the phrase to be verbalized in the custom voice alarm) of the request 110 via a voice recording, the user selects the voice recording option 520. For video/audio conveyance of the message in the request 110, the user selects the audio/video option 522.

FIG. 5E shows an example GUI 500E that is presented on the mobile device 104 responsive to selection of the text message option 518. The GUI 500E comprises a text portion 524 that provides visual feedback of the text message entered on the displayed virtual keyboard 526 by the user. In some embodiments, as noted above, text entry may be via alpha or alpha-numeric keypad, among other mechanisms. The GUI 500E also comprises an attachment icon 528 that enables a user to attach, as part of an request 110 to be sent to the server device 108 along with the text or voice recording, one or more files. The options icon 530 enables user selection of the same and activation of additional predetermined options as explained further below.

Responsive to selection of the attachment icon 528, the user is presented on the mobile device 104 with example GUI 500F, as shown in FIG. 5F. The GUI 500F enables the user to select, for attachment, one or more locally-stored files, such as an audio file via the audio option 532, and/or an audio/video file via the audio/video option 534. The user is also presented a browse option 536, which, in cooperation with browser software residing in memory 308 on the mobile device 104, enables a user to attach remotely located files, such as over the Internet.

FIG. 5G shows an example GUI 500G that is invoked by the user selecting the options icon 530 in the GUI 500E of FIG. 5E. The GUI 500G includes an accents option 538, effects option 540, and an accents & effects option 542. As explained above, the accents option 538 is selected to enable a user to modify the voice recording delivered in the request 110, or modify a generated audio version (voice) of a text message sent in the request 110. Further delineation of these features is invoked by a user selecting one of the options 538, 540, or 542.

FIG. 5H shows an example GUI 500H responsive to selection by the user of the accents option 538. The GUI 500H includes an auto-regional option 544 and a select region option 546. Responsive to selection of the auto-regional option 544, the request 110 sent by the mobile device 104 includes an indication of the GPS-determined regional coordinates of the sending mobile device 104. For instance, a user may choose to create a custom voice alarm based on a voice recording (or text message) with an accent to be determined based on the region in which the sending user is located. In one embodiment, the GPS unit 320 determines the regional coordinates (e.g., in delineations of region, such as south, west, north, east, or by state or a subset thereof). The alarm logic 316 accesses these determined coordinates and communicates, as part of the request 110 (or in association with the request in some embodiments) the GPS coordinates of the sending mobile device 104. The server device 108 may use these coordinates to apply an accent from the sending region (e.g., southern accent for GPS coordinates indicating the southern hemisphere of the United States, Irish accent for an English-speaking traveler in Ireland, different dialect for an Asian person in Bejing, versus, say, Taipei) to the recorded voice (or to the synthesized voice based on a communicated text message), such that when the alarm is triggered, the audible message has an accent corresponding to the current locale of the mobile device user. As another example, similar to that expressed above, a Chinese-speaking user travelling in China may create a custom alarm that is converted to a different Chinese dialect than his or her native language and corresponding to where he or she is currently located. The alarm could be used locally by the traveler or may be sent remotely to a family member at home—such that that person receives a wake up alarm that is in a different Chinese dialect. In this way, the traveler indirectly shares their travel experience with family members at home. In some embodiments, the aforementioned remote family member (i.e., their mobile device), also referred to herein as a third party, may not receive the custom alarm, but instead, GPS information from the traveler and use that information to transmit to the server device 108 as part of the request 110 to receive back a custom alarm in a Chinese dialect different than the native dialect of that user. In some embodiments, a language different than the user's native language is the language used in the custom voice alarm.

The select region option 546 enables a user to select an accent to be used in the voice of the custom voice alarm 112 corresponding to accents proximal to one of a displayed list of regions, including by continent, country, region (e.g., US or other regions, such as Middle East, Asian Pacific, etc.).

Referring to FIG. 5I, shown is an example GUI 500I that is presented (by the mobile device 104) to the user in response to selection of the effects option 540 in the GUI 500G. The GUI 500I presents a list of plural effects, including (without limitation) effects corresponding to the voices of famous people 548, media personalities 550, or other sound effects 552 (e.g., helium balloon sound, martian sound, etc.). In other words, the choice of one or more of these effects is indicated in the request 110 and used by the alarm generation logic 414 of the server device 108 to access a stored effect sample (file), and apply the effect to a synthesized voice (e.g., synthesized from a text message) or to modify a voice recording (sent in the request 110) with the selected effect.

Selection by the user of the famous people option 548 results in a list of famous voices that a user chooses to have as the voice in the custom voice alarm 112. For instance, the phrase, "wake up sleepy head" may be audibly conveyed from the mobile device 104 (responsive to an event trigger) in the voice of Ronald Reagan or Jimmy Carter, among other famous people. Selection by the user of the media personalities option 550 results in a list of media personalities (e.g., radio, movie, news, TV sitcom, etc.) from which a user may choose to mimic in the custom voice alarm 112 the voice of a media personality. For instance, "wake up sleepy head" may be audibly conveyed from the mobile device 104 (upon triggering of the alarm) from Dianne Sawyer, Sean Hannity, or Harrison Ford, among others. Selection of the sound effects option 552 likewise presents a list of selectable options, including helium balloon, martian voice, etc. that may be mimicked in the custom voice alarm 112.

FIG. 5J shows an example GUI 500J that is responsive to user selection of the media personalities option 550 in the GUI 500I. As shown, the GUI 500J shows a list of general category options to choose from, including by movie 554, television 556, and radio 558. In other words, the GUI 500J provides a further refinement of a selection from a previous GUI 500I. Taking the movies option 554 as an example, attention is directed to the example GUI 500K shown in FIG. 5K, which results from user selection of the movies option 554. The GUI 500K presents a list of further options under this category, such as selections of movie personalities (e.g., actors, actresses, characters, etc.) via alphabetical 560, search engine 562, and genre 564. For instance, in response to the user selecting the alphabetical option 560, a list of movie titles is presented, beneath which contains a listing of characters and corresponding actresses and actors. In some embodiments, the listing of movie titles may be contiguous, and responsive to selection of a given title, another GUI is invoked listing the characters portrayed in that movie along with the corresponding actors and actresses. Additional functions may be included in any resulting screens, such as sort options.

Responsive to selecting the genre option 564, a list of movie personalities (e.g., characters, actresses, actors, etc.) in movies categorized by genre may be presented, including according to whether the movie is characterized as a comedy, drama, etc. For instance, a contiguous list of comedic actors, such as Robin Williams, Steve Martin, etc. may be presented on the display, followed by a contiguous list of action actors, such as Harrison Ford, Sylvester Stallone, etc. may be presented, and so forth. In some embodiments, the genres may be contiguously listed (e.g., comedy, immediately followed by drama, immediately followed by mystery, etc.) with access to actors, characters, etc. achieved via additional GUIs invoked from selection of the given genre.

Responsive to user selection of the search option 562, the example GUI 500L is presented, as shown in FIG. 5L, which allows the user to enter a manual search for a given media personality. The GUI 500L comprises a search window 566, a displayed (virtual) keyboard 568, and an accept button icon 570 that enables the user to complete his or her search query. In this example, the user enters the movie character, "Obi-Wan Kenobi," in the search window 566 via text entry 568, and selects accept 570 when complete. Note that such features, such as smart/auto-fill, etc. may be implemented in some embodiments.

When the user has completed entry of the information sufficient to generate the request 110, the GUI 500M is presented on the mobile device 104, as illustrated in FIG. 5M. The GUI 500M comprises a text message window 572, an options icon 574, and an attachment icon 576, as well as a destination option 578. Note that the destination option 578 corresponds to the intended recipient(s) of the custom voice alarm 112, and not to the server device 108. In other words, by entering the configuration session for crafting a custom voice alarm, the mobile device 104 is preconfigured to deliver the request 110 that results from the configuration session to the server device 108. In this example, the message, "Luke wake up and may the force be with you" is presented in the text message window 572, with an optional visual indication of an added option to the request (e.g., effects, as shown in the text message field of the request between "< >" but not limited to this manner of visual indication). In some embodiments, an icon (e.g., in the corner of the window 572) may be displayed, which acknowledges to the user the incorporation of an effects (and/or accents) option in the request 110.

Responsive to selecting the destination option 578, the user is presented the example GUI 500N shown in FIG. 5N. The mobile device 104 accesses the contacts database 312 to populate the display with a list of contacts 580 that serve as candidates for receipt of the custom voice alarm 112. The user may also be presented with a sub-window (and virtual keyboard) that allows manual entry of a destination not currently found in the contacts database 312. The selected destination is incorporated in, or associated with, the request 110 sent by the mobile device 104.

Once the user selects the appropriate destination for the custom voice alarm 112, the user is presented with an option to send the request 110 (e.g., via a separate screen, similar to that shown in FIG. 5N, with a send icon), and the mobile device 104 sends the request to the server device 108 responsive to user selection of a send option. In some embodiments, merely selecting the appropriate contact(s) triggers the delivery of the request 110.

Subsequent to receiving the custom voice alarm 112 from the server device 108, the mobile device 104 stores the custom voice alarm for later access by the user, such as access to the custom voice alarm via GUI 500B.

The user also may configure alarm functionality according to one or more GUIs. For instance, attention is directed to FIG. 5O, which shows an example GUI 500O where the user selects options for the frequency of triggering an alarm (whether custom or "canned"). In the example depicted in FIG. 5O, the user is presented with an alarm set daily option 582 and an alarm set calendar option 584. Note that in some embodiments, such a GUI 500O may be presented at a time corresponding to selection of the alarm options, such as shown in FIGS. 5B-5C. The alarm set daily option 582, when selected, provides a GUI that enables the user to set a time for the daily triggering of the alarm. The alarm set calendar option 584, when selected, enables the user to access a displayed calendar (e.g., as assisted by the calendar application 314) in which the user selects a date for a given alarm triggering event.

It is noted that, though wake-up type alarm events have been described herein, other alarm events are contemplated to be within the scope of the disclosure, including those triggered by certain events (e.g., anniversaries, birthdays, holidays), reminders, etc. Further, though described in association with the setting of a single alarm, multiple different alarm triggering events may be configured (e.g., in a single configuration session), and hence are contemplated to be within the scope of the present disclosure.

Reference is made to FIG. 5P, which shows an example GUI 500P that illustrates an example of a GUI that is prompted from selection of the alarm set daily option 582. The GUI 500P comprises an AM/PM option 586, an hour option 588, and a minute option 590 for enabling user selection of the time of day, hour, and minute for triggering a daily alarm. The scroll icons 592 enable the user to select the time of day or particular time. In some embodiments, the scroll icons 592 may be omitted, and further refinement may be achieved via selection of the options 586, 588, and/or 590. The accept button icon 594, when selected, accepts the setting of the alarm, and then in one embodiment, the user is presented with options for the type of alarm functionality, such as via GUI 500B.

Figure 6:
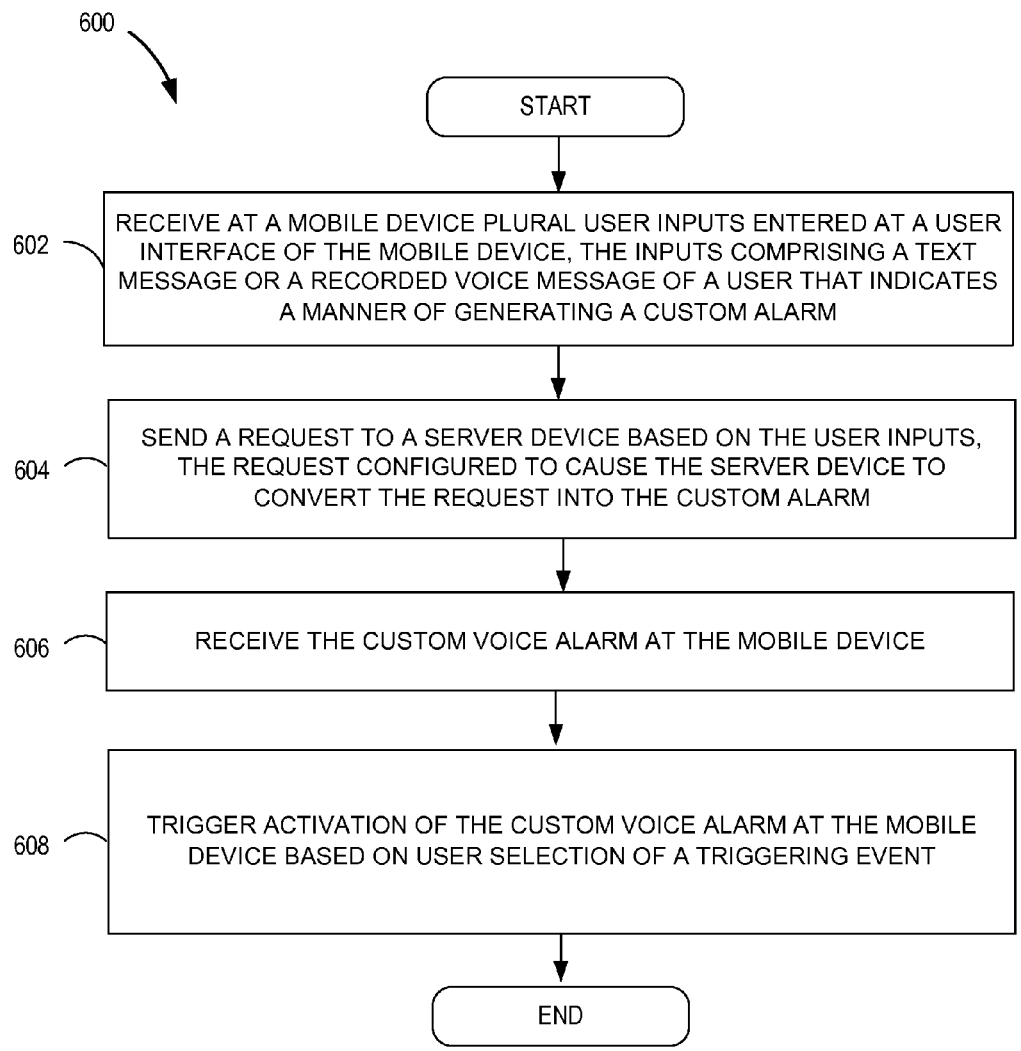
FIG. 6 is a flow diagram that illustrates an example method embodiment as implemented at a mobile device for providing a request to a server device to customize an alarm.

Having described certain embodiments of custom voice alarm systems, it should be appreciated, in view of the aforementioned description, that one custom voice alarm method 600, depicted in FIG. 6 and employed by a mobile device (e.g., mobile device 104), comprises receiving at a mobile device plural user inputs entered at a user interface of the mobile device, the inputs comprising a text message or a recorded voice message of a user that indicates a manner of generating a custom voice alarm (602); sending a request to a server device based on the user inputs, the request configured to cause the server device to convert the request into the custom voice alarm (604); receiving the custom voice alarm at the mobile device (606); and triggering activation of the custom voice alarm at the mobile device based on user selection of a triggering event (608).

Figure 7:
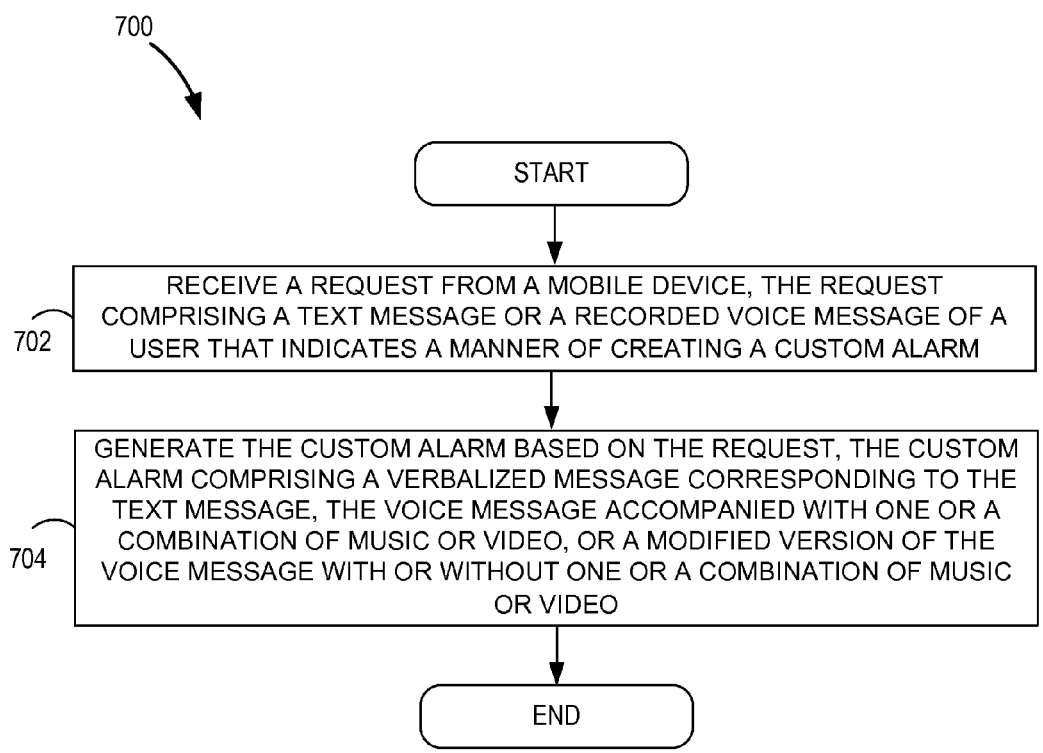
FIG. 7 is a flow diagram that illustrates an example method embodiment as implemented at a server device for generating a custom voice alarm.

In view of the aforementioned description, it should be appreciated that another custom voice alarm method 700, depicted in FIG. 7 and employed by a server device (e.g., server device 108), comprises receiving a request from a mobile device, the request comprising a text message or a recorded voice message of a user that indicates a manner of creating a custom voice alarm (702); and generating the custom voice alarm based on the request, the custom voice alarm comprising a verbalized message corresponding to the text message, the voice message accompanied with one or a combination of music or video, or a modified version of the voice message with or without one or a combination of music or video (704).

It should be appreciated that the blocks depicted in FIGS. 6 and 7 collectively correspond to custom voice alarm methods. If embodied in software, each block depicted in FIGS. 6 and 7 represents a module, segment, or portion of code that comprises program requests stored on a non-transitory computer readable medium to implement the specified logical function (s). In this regard, the program requests may be embodied in the form of source code that comprises statements written in a programming language or machine code that comprises numerical requests recognizable by a suitable execution system such as the mobile device 104 or server device 108. The machine code may be converted from the source code, etc. If embodied in hardware, each block may represent a circuit or a number of interconnected circuits to implement the specified logical function(s). It should be appreciated that, though certain components of embodiments of custom voice alarm systems have been depicted as implemented as software, in some embodiments, one or more of the functionality described herein as implemented in software may be implemented in hardware or a combination of software and hardware.

Although the flow diagrams of FIGS. 6 and 7 show a specific order of execution, it is understood that the order of execution may differ from that which is depicted. Further, the methods described in FIGS. 6 and 7 are not limited to the devices or device architectures described herein.

It should be emphasized that the above-described embodiments are merely examples of possible implementations. Many variations and modifications may be made to the above-described embodiments without departing from the principles of the present disclosure. For instance, though a plurality of user interface screens (e.g., GUIs) have been described, in some embodiments, the effect and/or accents may be entered as inputs manually as part of the text message (e.g., delineated from the rest of the text message according to tags (character symbols or alpha-character sequences), and the server device 108 parses the request 110 in a manner that recognizes the delineations between text message and accents and/or effects. Upon such parsing, the server device 108 may embark on a search within the database for equal text names for corresponding files, and configure the custom voice alarm accordingly, thus negating the need for some of the GUIs disclosed herein. All such modifications and variations are intended to be included herein within the scope of this disclosure and protected by the following claims.

At least the following is claimed:
1. An electronic device, comprising:
a user interface;

a memory comprising alarm logic;
and a processor configured to execute the alarm logic to:
receive input entered by a user at the user interface, the input corresponding to user configuration of a custom voice alarm, the input comprising input selections corresponding to the custom voice alarm and a triggering event for activation of the custom voice alarm;
send a request to a server device based on the input, wherein the request comprises either a text message or a voice recording of the user, wherein the request further comprises an indication of a desired accent for a voice to be used in the custom voice alarm, wherein the text message and the voice recording each comprises a phrase vocalized in the custom voice alarm, the indication separately designated by the user for inclusion with the text message to form the request;
receive the custom voice alarm from the server device, the custom voice alarm based on the request; and
trigger the activation of the custom voice alarm based on the triggering event;
wherein the triggering event comprises time information specifying a time the custom voice alarm is to be activated and recipient information specifying a recipient of the custom voice alarm.

2. The electronic device of claim 1, wherein the user interface comprises a mobile phone touch-screen display screen.

3. The electronic device of claim 1, wherein the request further comprises an audio file corresponding to music being included in the custom voice alarm, a video file or image file corresponding to video or an image being included in the custom voice alarm, or a combination of the audio file and either the video file or the image file.

4. The electronic device of claim 1, wherein the request further comprises an indication of a person to be used as the source of the voice used in the custom voice alarm.

5. The electronic device of claim 1, wherein the processor is further configured by the alarm logic to:
store the custom voice alarm in the memory;
provide for display a plurality of alarm settings on the user interface, the plurality of alarm settings comprising a custom voice alarm option and a non-custom voice alarm option; and
play back the custom voice alarm responsive to the activation of the custom voice alarm option.

6. The electronic device of claim 1, wherein the custom voice alarm is an audio verbalization of a text message included in the request, the audio verbalization accompanied with one or a combination of music or video.

7. The electronic device of claim 6, wherein the audio verbalization is in the voice of the user with modification of the user's voice, or in the voice of another person.

8. The electronic device of claim 7, wherein a file of the user's voice, the voice of the other person, or voice parameters for either is stored at the server device.

9. The electronic device of claim 1, wherein the custom voice alarm is an audio verbalization based on a recorded voice message included in the request or a default voice stored previously at the server device.

10. The electronic device of claim 9, wherein the custom voice alarm comprises the message of the voice message in the user's modified voice, the message of the voice message in the user's normal voice accompanied with one or a combination of music or video, or the message of the voice message in another person's voice with one or a combination of video or audio.

11. The electronic device of claim 1, wherein the processor is further configured to present a plurality of sequentially accessed graphical user interfaces on the user interface, the plurality of graphical user interfaces each comprising plural selectable options corresponding to accents to be incorporated in the custom voice alarm, effects to be incorporated in the custom voice alarm, or a combination of accents and effects to be incorporated in the custom voice alarm.

12. The electronic device of claim 1, wherein the time information comprises at least one of the following: date, time and frequency, and the recipient is selected from at least one of the following: a user of the electronic device and a contact from a database of the electronic device.

13. A method, comprising:
receiving at a mobile device plural user inputs entered at a user interface of the mobile device, the inputs comprising a text message of a user that indicates a manner of generating a custom voice alarm, the inputs corresponding to input selections by the user, at the user interface, of the custom voice alarm and a triggering event for activation of the custom voice alarm, wherein the triggering event comprises time information specifying a time the custom voice alarm is to be activated and recipient information specifying one of a plurality of recipients of the custom voice alarm;
sending a request to a server device based on the user inputs, the request configured to cause the server device to convert the request into the custom voice alarm;
receiving the custom voice alarm at the mobile device, wherein the custom voice alarm is an audio verbalization of the text message and a desired accent included in the request; and
triggering the activation of the custom voice alarm at the mobile device based on user selection of the triggering event.

14. The method of claim 13, wherein the request further comprises one or a combination of a video file or an audio music file.

15. The method of claim 13, wherein the audio verbalization is in the voice of the user, in the voice of the user with modification of the user's voice, or in the voice of another person.

16. The method of claim 15, wherein a file of the user's voice, the voice of the other person, or voice parameters for either is stored at the server device.

17. The method of claim 13, further comprising sending a second request for a second custom voice alarm to the server device based on the plural inputs, wherein the second request further comprise a destination address for a recipient device, the recipient device comprising a destination for the custom voice alarm different than the mobile device, and receiving the second custom voice alarm at the recipient device for playback responsive to a triggering event associated with the recipient device.

18. The method of claim 13, wherein the plural user inputs further comprise instructions to include an accent based on a region in the custom voice alarm, the region based on a selected region, a region of a third party, or derived regional coordinates.

19. A server device, comprising:
a memory comprising alarm generation logic; and
a processor configured to execute the alarm generation logic to:
receive a request from a mobile device, the request comprising a text message or a recorded voice message of a user that indicates a manner of creating a custom voice alarm, the request corresponding to input selections by the user of the custom voice alarm and a triggering event for activation of the custom voice alarm, the triggering event being a specified time, wherein the request further comprises respective indications of a voice and desired accent for the voice to be collectively used in the custom voice alarm, wherein the text message and the voice recording each comprises a phrase vocalized in the custom voice alarm, the indication of the accent separately designated relative to the voice indication by the user for inclusion with the text message to form the request; and
generate the custom voice alarm based on the request, the custom voice alarm comprising a verbalized message corresponding to the text message, the recorded voice message accompanied with one or a combination of music or video, or a modified version of the recorded voice message with one or a combination of music or video.

20. The server device of claim 19, wherein the processor is further configured to execute the generation logic to send the custom voice alarm to the mobile device or another mobile device.

21. The server device of claim 19, wherein the indication of the desired accent comprises a region indication based either on user selection of a region option, a detected region of a third party, or derived regional coordinates, wherein the modified version comprises an accent that is based on the region indication.

* * * * *